No. 871,047. PATENTED NOV. 12, 1907.
Z. G. SHOLES.
FASTENING FOR VEHICLE TOP BOWS.
APPLICATION FILED FEB. 2, 1907.
2 SHEETS—SHEET 1.
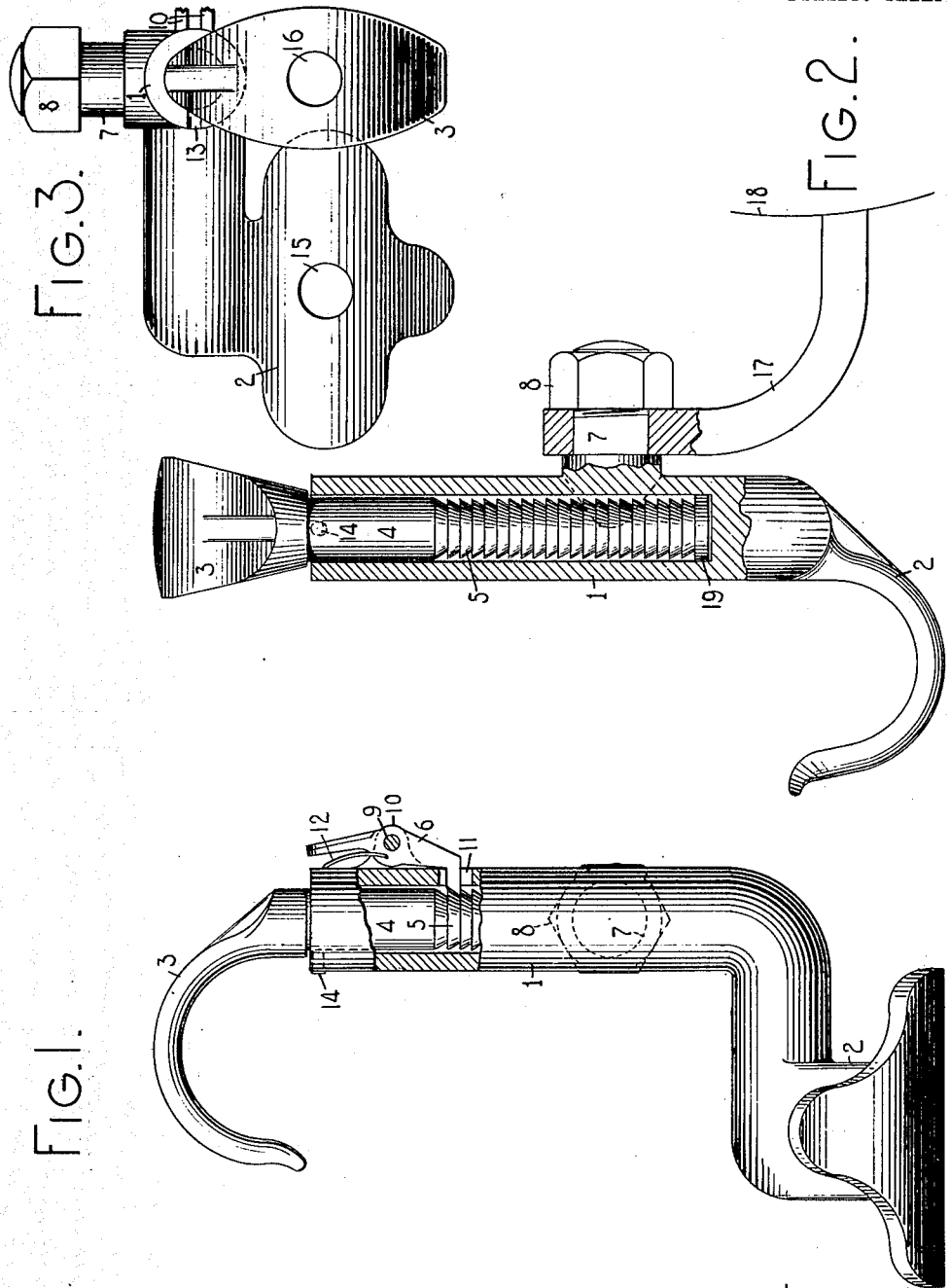
WITNESSES:
Wm. H. Shaw
William Wettstein
INVENTOR:
Zalmon G. Sholes
By Daniel A. Carpenter,
HIS ATTORNEY No. 871,047. PATENTED NOV. 12, 1907.
Z. G. SHOLES.
FASTENING FOR VEHICLE TOP BOWS.
APPLICATION FILED FEB. 2, 1907.
2 SHEETS—SHEET 2.
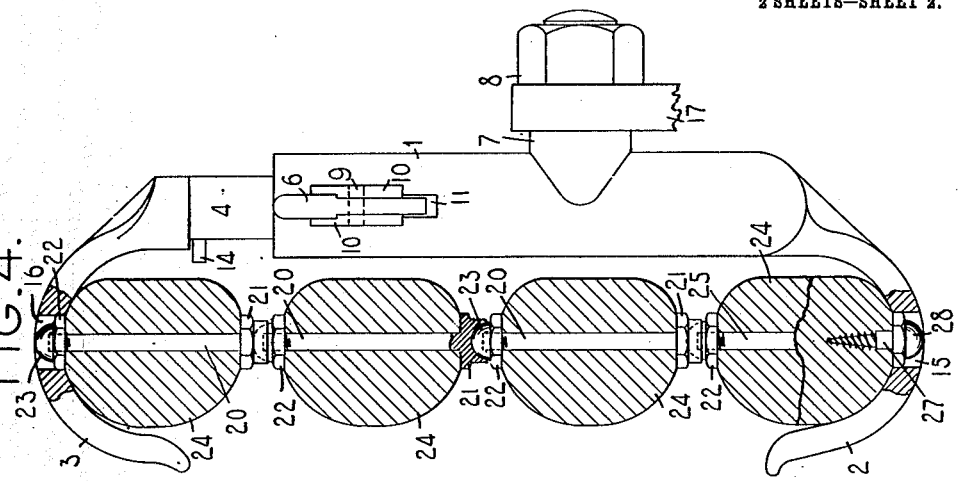
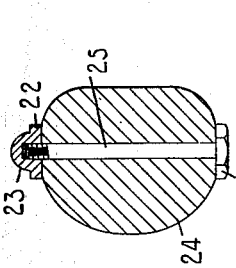
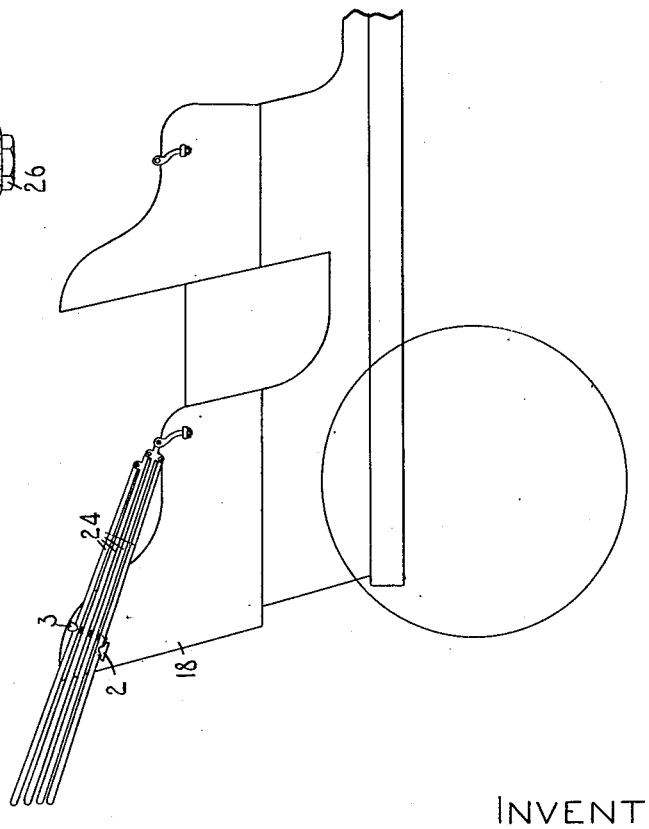
WITNESSES.
INVENTOR.
HIS ATTORNEY

UNITED STATES PATENT OFFICE.

ZALMON G. SHOLES, OF NEW YORK, N. Y.

FASTENING FOR VEHICLE-TOP BOWS.

No. 871,047.      Specification of Letters Patent.      Patented Nov. 12, 1907.

Application filed February 2, 1907. Serial No. 355,346.

*To all whom it may concern:*

Be it known that I, ZALMON G. SHOLES, a citizen of the United States, and a resident of the borough of Manhattan, in the county, city, and State of New York, have invented a certain new and useful Improvement in Fastenings for the Bows of Vehicle-Tops, of which the following is a full, clear, and exact description, reference being made to the accompanying drawings, forming part of this specification.

This invention relates to improvements in means for securing the bows of a folding vehicle-top together and to the body of the vehicle, when the top is folded, the main object of the invention being to provide fastenings of the character indicated which shall have peculiar advantages rendering them especially desirable for use on automobiles.

The invention consists of a bow-fastening, and of devices forming parts thereof, and includes the features of construction, combinations and arrangements of parts which are hereinafter described and specified in the claims.

On the accompanying sheets of drawings, on which like reference-numerals designate like parts in different views, Figure 1 is a front and partly sectional view of a clamp embodying features of the invention, the clamp having a lower fixed jaw and an upper movable jaw; Fig. 2, a side and sectional elevation of the clamp attached to a supporting arm, the clamp being viewed from the side which is the right side in Fig. 1; Fig. 3, a top view of the clamp, the pawl shown in Fig. 1 and parts of its supporting lugs being omitted, and the position of the upper jaw being different from that shown in Figs. 1 and 2; Fig. 4, a side view of the clamp, a cross-section of the bows of a vehicle-top, and a side and partly sectional view of a series of spacing-devices attached to the bows, the clamp, bows and spacing-devices being shown as they appear when the invention is in use; Fig. 5, a cross-section of the lowermost of the bows shown in Fig. 4 and a side and partly sectional view of a bolt which extends through the bow, the nut of the bolt forming part of the series of spacing-devices; and Fig. 6, a diagrammatic side elevation of a portion of an automobile, and of the bows of the top secured together and to the body of the vehicle by means of the invention.

The clamp is preferably composed of the tubular post 1, the fixed jaw 2 formed on the post and at one side of its axis, the movable jaw 3 and stem 4 fast together, the stem having on it ratchet-teeth 5 and fitting loosely in the post 1, and the pawl 6 mounted on the post and engaging with the ratchet-teeth, the post being adapted to be fastened to a fixed support on the body of a vehicle by means of a screw-threaded stud 7 projecting from the post and having on it a nut 8. The pawl 6 is pivoted by a pin 9 to and between lugs 10 projecting from the post 1, and extends through a slot 11 in the post to the ratchet-teeth 5, with which it is normally held engaged by a spring 12 attached to the pawl and bearing against the post. In the top of the post is a recess 13, in which fits a pin 14 which is fast on the stem 4 and projects outward therefrom. The lower jaw of the clamp has in it a round hole 15 and in the upper jaw is a similar hole 16.

The clamp, which may be attached, for example, to an arm 17 fast on the body 18 of the vehicle, as shown by Fig. 2, is to be so fastened to its support that the post shall be upright or nearly so and the jaws 2 and 3 shall be respectively lower and upper jaws, the lower and fixed jaw 2 being so located that when the top of the vehicle is folded the lower bow will rest naturally on this jaw. When the top is in use the upper and movable jaw 3 may be in the position shown by Figs. 1 and 2, where it will be kept by means of the pin 14 extending through the recess 13. The pin will be kept in the recess, should the jolting of the vehicle tend to displace the pin, by the action of the pawl on the ratchet-tooth which is shown (Fig. 1) engaged with the pawl. The upper jaw, if it is in the position in which it is shown in Figs. 1 and 2, will not interfere with the raising or lowering of the top, for the bows will then pass outside of this jaw.

As the ratchet-teeth 5 extend entirely around the stem 4, the jaw 3 may be rotated or moved angularly on the axis of the stem 4 towards and from its inoperative position, without interference from the pawl, no matter with what ratchet-tooth the pawl may be engaged, whenever the pin 14 is above the upper end of the recess 13. When the upper end of the pawl is held close to the post the jaw 3 may be raised from the position shown in Figs. 1 and 2, until the upper face of the cylindrical part 19 of the stem is engaged by the pawl, the limit of the outward movement of the lower end of the pawl being such that the ratchet-teeth can pass the pawl, but that the part 19 cannot. If the upper jaw is raised to any position the pawl prevents it from dropping from that position, but the jaw may be easily pushed downward with the hand to the limit of its vertical movement. It will drop from its highest position until it is arrested, either by contact of the pin 14 with the post 1 or by other means, if the pawl is pressed close to the post and there held for a moment.

The series of spacing-devices—or bow-spreaders or bow-separators—comprises a bolt 20 (Fig. 4) having a cupped head 21 and a nut 22 on which is a protuberance 23. This bolt is adapted to be inserted in and to extend through one of the bows and to co-act with other similar bolts and with the clamp when the bows 24 are secured together as they are shown in Fig. 4. Three of the four bolts shown in Fig. 4 are alike in all respects, and the other bolt 25 is like the bolts 20 except that its head 26 (Fig. 5) differs from the heads 21 as it is not cupped. In the bow on which the bolt 25 is shown is a screw 27, whose head 28 is made to fit in the hole 15 in the lower jaw of the clamp, and this screw is so located on the bow that when the top is folded the head 28 of the screw extends into the hole 15, while the lower surface of the bow then contacts with the face of the jaw. The nut 22, of the bolt which is uppermost when the top is folded, fits in the hole 16 in the jaw 3 of the clamp, and the protuberance 23 on the nut of each of the other bolts fits in the cupped head of the bolt which is then next above it. A screw like the screw 27 might be substituted for the bolt 25.

It will be seen that the lower jaw of the clamp is located at that side of the axis of the post 1 which, when the clamp is attached to a vehicle, is towards the back of the vehicle. If, therefore, the position of the clamp is such that when the top is folded the folds between the bows lie close to the bow-separators or spacing-devices, the bows will be supported by the clamp behind the folds, or farther from the pivoted ends of the bows than they would be if the lower jaw of the clamp was directly in front, or at the outer side, of the axis of the post.
By means of the fastening described the bows of a vehicle-top may be secured together and to the body of the vehicle almost instantly, and so firmly that they cannot rattle and will not be thrown upward, or be marred or badly strained, by the jolting of the vehicle.
After the top has been lowered the upper jaw of the clamp is raised and swung over the bows, and then it is pushed down until it is tight on the upper bow. It is locked in its depressed position, or fastened to the post, by the automatic movement of the spring-pressed pawl 6 into engagement with one of the ratchet-teeth 5 as above explained.

It will be understood that clamps, embodying features of the invention differing in form and arrangement from those which are illustrated and specifically described herein, might be constructed, and that clamps embodying features of the invention might be used either combined with bow-spreaders or spacing-devices like or differing from those herein described and claimed, or uncombined with such devices, and that the spacing-devices or bow-spreaders may be used in combination with clamps of different forms, or with straps instead of clamps.

Having thus described my invention, what I claim as new and desire to secure by Letters Patent, is:

1. Means including a clamp for securing the bows of a vehicle-top together and to the body of the vehicle, said clamp comprising a lower fixed jaw adapted to be fastened to the body of the vehicle, an upper jaw movable both vertically and angularly, and automatic means for locking the movable jaw at a proper distance from the fixed jaw.

2. Means including a clamp for securing the bows of a vehicle-top together and to the body of the vehicle, said clamp being composed of a post adapted to be fastened to the body of the vehicle, a lower fixed jaw on said post, an upper movable jaw mounted on the post, and automatic means for locking the movable jaw to the post.

3. Means including a clamp for securing the bows of a vehicle-top together and to the body of the vehicle, said clamp being composed of a tubular post adapted to be fastened to the body of the vehicle, a lower fixed jaw on said post, an upper movable jaw having a stem fitting in said post, and automatic means for locking said stem to the post.

4. The combination with the bows of a vehicle-top of means, including a clamp and a series of spacing devices, for securing the bows together and to the body of the vehicle, said clamp comprising a lower fixed jaw adapted to be fastened to the body of the vehicle, an upper movable jaw, and automatic means including ratchet-teeth and a pawl for locking the movable jaw at a proper distance from the fixed jaw.

5. Means including a clamp for securing the bows of a vehicle-top together and to the body of the vehicle, said clamp being composed of a post adapted to be fastened to the body of the vehicle, a lower fixed jaw on said post, an upper movable jaw mounted on the post, and automatic means including ratchet-teeth and a pawl for locking the movable jaw to the post.

6. Means including a clamp for securing the bows of a vehicle-top together and to the body of the vehicle, said clamp being composed of a tubular post adapted to be fastened to the body of the vehicle, a lower fixed jaw on said post, an upper movable jaw having a stem fitting in said post, and automatic means including ratchet-teeth and a pawl for locking the movable jaw to the post.

7. Means including a clamp for securing the bows of a vehicle-top together and to the body of the vehicle, said clamp being composed of a tubular post adapted to be fastened to the body of the vehicle, a lower fixed jaw on said post, an upper movable jaw having a stem fitting in said post, and automatic means including ratchet-teeth and a pawl for locking the movable jaw to the post, the ratchet-teeth being on said stem and the pawl being mounted on the post.

8. Means including a clamp for securing the bows of a vehicle-top together and to the body of the vehicle, said clamp being composed of a post adapted to be fastened to the body of the vehicle, a lower fixed jaw on said post, an upper jaw mounted on the post and movable both vertically and angularly, and means for locking the movable jaw to the post.

9. Means including a clamp for securing the bows of a vehicle-top together and to the body of the vehicle, said clamp being composed of a tubular post adapted to be fastened to the body of the vehicle, a lower fixed jaw on said post, an upper jaw having a stem fitting in said post and movable both vertically and angularly, and means for locking said stem to the post.

10. Means including a clamp for securing the bows of a vehicle-top together and to the body of the vehicle, said clamp comprising a lower fixed jaw adapted to be fastened to the body of the vehicle, an upper jaw movable both vertically and angularly, and automatic means including ratchet-teeth and a pawl for locking the upper jaw at a proper distance from the fixed jaw.

11. Means including a clamp for securing the bows of a vehicle-top together and to the body of the vehicle, said clamp being composed of a post adapted to be fastened to the body of the vehicle, a lower fixed jaw on said post, an upper jaw mounted on the post and movable both vertically and angularly, and automatic means including ratchet-teeth and a pawl for locking the movable jaw to the post.

12. Means including a clamp for securing the bows of a vehicle-top together and to the body of the vehicle, said clamp being composed of a tubular post adapted to be fastened to the body of the vehicle, a lower fixed jaw on said post, an upper jaw having a stem fitting in said post and movable both vertically and angularly, and automatic means including ratchet-teeth and a pawl for locking said stem to the post.

13. Means including a clamp for securing the bows of a vehicle-top together and to the body of the vehicle, said clamp being composed of a tubular post adapted to be fastened to the body of the vehicle, a lower fixed jaw on said post, an upper jaw having a stem fitting in said post and movable both vertically and angularly, and automatic means including ratchet-teeth and a pawl for locking said stem to the post, the ratchet-teeth being on said stem and the pawl being mounted on the post.

14. Means including a clamp for securing the bows of a vehicle-top together and to the body of the vehicle, said clamp comprising a lower fixed jaw adapted to be fastened to the body of the vehicle, an upper jaw movable both vertically and angularly, means for locking the upper jaw at a proper distance from the fixed jaw, and means for keeping the upper jaw in an inoperative position towards and from which it is movable angularly.

15. Means including a clamp for securing the bows of a vehicle-top together and to the body of the vehicle, said clamp being composed of a post adapted to be fastened to the body of the vehicle, a lower fixed jaw on said post, an upper jaw mounted on the post and movable both vertically and angularly, means for locking the movable jaw to the post, and means for keeping the upper jaw in an inoperative position towards and from which it is movable angularly.

16. Means including a clamp for securing the bows of a vehicle-top together and to the body of the vehicle, said clamp comprising a lower fixed jaw adapted to be fastened to the body of the vehicle, an upper jaw movable both vertically and angularly, automatic means including ratchet-teeth and a pawl for locking the upper jaw at a proper distance from the fixed jaw, and means for keeping the upper jaw in an inoperative position towards and from which it is movable angularly.

17. Means including a clamp for securing the bows of a vehicle-top together and to the body of the vehicle, said clamp being composed of a post adapted to be fastened to the body of the vehicle, a lower fixed jaw on said post, an upper jaw mounted on the post and movable both vertically and angularly, automatic means including ratchet-teeth and a pawl for locking the movable jaw to the post, and means for keeping the upper jaw in an inoperative position towards and from which it is movable angularly.

18. Means including a clamp for securing the bows of a vehicle-top together and to the body of the vehicle, said clamp being composed of a tubular post adapted to be fastened to the body of the vehicle, a lower fixed jaw on said post, an upper movable jaw having a round stem fitting in said post and having on it ratchet-teeth extending around the stem, and a pawl mounted on the post and engaged with said ratchet-teeth.

19. Means including a clamp for securing the bows of a vehicle-top together and to the body of the vehicle, said clamp being composed of a tubular post adapted to be fastened to the body of the vehicle, a lower jaw fixed on said post, an upper movable jaw having a round stem fitting in said post and having on it ratchet-teeth extending around the stem, a pawl mounted on the stem and engaged with said ratchet-teeth, and means for keeping the upper jaw in an inoperative position towards and from which it is movable angularly.

20. The combination with the bows of a vehicle-top of means, including a clamp and a series of spacing-devices, for securing the bows together, said series of spacing-devices comprising bolts having cupped heads, and nuts on which are protuberances conforming to the cavities in the heads, each of said bolts extending through one of the bows, and the heads and nuts being arranged to fit together in order, and to be held together by the clamp when the bows are secured in the clamp.

21. Means including a clamp and a bolt for securing the bows of a vehicle-top together, said bolt being coöperative with the clamp and other bolts, and having a cupped head, and a nut on which is a protuberance conforming to the cavity in the head of another similar bolt.

22. A series of spacing-devices for use on the bows of vehicle-tops, said series of devices including a bolt adapted to be inserted in and to extend through one of the bows and having a cupped head, and a nut on which is a protuberance conforming to the cavity in the head of another similar bolt.

23. A series of spacing-devices for use on the bows of vehicle-tops, said series of devices including bolts adapted to be inserted in and to extend through the bows, some of said bolts having cupped heads, and some having nuts on which are protuberances made to fit in the cavities in said cupped heads.

ZALMON G. SHOLES.

In presence of—
 E. M. WELLS,
 D. A. CARPENTER.